United States Patent [19]
Hartman et al.

[11] Patent Number: 5,950,660
[45] Date of Patent: Sep. 14, 1999

[54] HOUSING ASSEMBLY FOR FIXED CONE SLEEVE VALVE

[76] Inventors: Brian T. Hartman, 2253 E. Contessa Cir., Mesa, Ariz. 85213; Thomas A. Hartman, 700 Capac Ct., St. Louis, Mo. 63125

[21] Appl. No.: 09/085,935

[22] Filed: May 28, 1998

[51] Int. Cl.[6] .................................................. F16K 1/12
[52] U.S. Cl. ........................................... 137/219; 251/279
[58] Field of Search .............................. 137/219; 251/279

[56] References Cited

U.S. PATENT DOCUMENTS

| | | | |
|---|---|---|---|
| 1,477,722 | 12/1923 | Slattery | 137/219 |
| 2,416,787 | 3/1947 | White | 137/219 X |
| 2,725,891 | 12/1955 | De Bourguignon et al. | 137/219 |
| 3,556,128 | 1/1971 | Scaglione . | |
| 3,847,374 | 11/1974 | Tittelbach . | |
| 4,026,327 | 5/1977 | Deinlein-Kalb . | |
| 4,330,012 | 5/1982 | Chadwick . | |
| 4,589,439 | 5/1986 | Steingass | 137/219 |
| 5,509,787 | 4/1996 | Valdes . | |
| 5,622,201 | 4/1997 | Chang . | |
| 5,826,613 | 10/1998 | Schalk | 137/219 |

FOREIGN PATENT DOCUMENTS

| | | | |
|---|---|---|---|
| 951691 | 10/1956 | Germany | 137/219 |
| 1537604 | 1/1979 | United Kingdom | 137/219 |

*Primary Examiner*—Gerald A. Michalsky
*Attorney, Agent, or Firm*—Howell & Haferkamp, L.C.

[57] ABSTRACT

A liquid flow control system comprises an upstream length of conduit, a downstream length of conduit, a valve housing, a cone valve seat and a sleeve valve. The valve housing is connected between the upstream length of conduit and the downstream length of conduit. The valve housing directs a flow of liquid that exits the upstream length of conduit through the valve housing and into the downstream length of conduit. The cone valve seat is mounted stationary in the valve housing. The sleeve valve is mounted in the valve housing for movement between a closed position wherein the sleeve valve is in engagement with the cone valve seat and an opened position wherein the sleeve valve is disengaged from the cone valve seat. The downstream length of conduit is comprised of a spacer section and a reducer section downstream from the spacer section. The spacer section spaces the reducer section a predetermined distance from the base of the fixed cone of the valve that results in a significant reduction or elimination of cavitation in liquid discharged from the valve.

17 Claims, 6 Drawing Sheets

HOUSING ASSEMBLY FOR FIXED CONE SLEEVE VALVE

BACKGROUND OF THE INVENTION

This invention relates generally to the valve art and, more particularly, to fixed cone sleeve valves.

Fixed cone sleeve valves have been used for many years as free discharge valves. Fixed cone sleeve valves have been used primarily as control valves in reservoir discharge and turbine bypass systems because of their suitability for braking high pressure heads. A typical fixed cone sleeve valve consists of a cylindrical interior conduit that is surrounded by a thin, axially moveable sleeve. A conical valve seat with its apex pointing upstream is held in place downstream of the interior conduit by a series of radially extending vanes. The valve is operated by axially sliding the sleeve toward or away from the conical valve seat. The sleeve is moved axially up against the conical valve seat to close the valve, and is moved away from the conical valve seat to open the valve. The jet issuing from the valve resembles a hollow diverging cone that continues to spread out through the atmosphere. The energy of the jet is eventually dissipated by air friction as it is broken down into a fine spray. This helps to prevent erosion of downstream banks and plunge pools.

Fixed cone sleeve valves such as these are often used in reservoir discharge and turbine bypass systems because of their ability to operate under high pressure heads while still permitting accurate flow control. Hoods are sometimes installed on the downstream end of the valve to confine the expanding jet and reduce undesired spray. Although fixed cone sleeve valves are generally used for free discharge applications, they can also operate partially or fully submerged.

As explained below more fully, despite their popularity in free discharge and submerged discharge applications, fixed cone sleeve valves have not successfully been operated as in-line control valves where they would control liquid flow through a pipeline or series of conduits. This is because in the past when fixed cone sleeve valves were used in enclosed pipelines the discharge from the valve would create a significant amount of cavitation in the liquid flow downstream from the valve.

In-line control valves are often called upon to withstand large pressure head drops and to operate smoothly under high velocity and high flow conditions. However, if local pressures within the valve or jet drop below the vapor pressure of water, cavitation can result and cause serious performance problems. The mechanism for cavitation entails the formation of small vapor nuclei, their subsequent growth within low pressure regions of a flow, and their violent collapse as they enter regions of high pressure. The energy released by the collapse of the vapor cavities typically causes noise and vibration within a hydraulic system. Strong cavitation near valve or pipe boundaries can cause damage or even failure of system components. Regions of low pressure in valves typically occur immediately downstream from an abrupt change in a valve's interior geometry. The flow in these regions tends to be highly turbulent with numerous eddies.

In the case of a fixed cone sleeve valve, low pressure regions occur just downstream of the sleeve and the fixed cone. At higher flow rates, these regions are likely to initiate cavitation.

The phenomenon of cavitation in valves has been a constraint in their application for many years. In the case of free discharge valves, such as fixed cone sleeve valves, cavitation is not a problem because the surrounding air helps maintain atmospheric pressure levels in the jet, and because there is no hydraulic system downstream to damage. By contrast, in-line control valves are susceptible to cavitation due to the fact that they operate in a closed system that prevents natural aeration of the flow by the atmosphere.

For these reasons, and despite their ability to accurately control flow under high pressure heads, fixed cone sleeve valves have not successfully been operated as in-line control valves.

SUMMARY OF THE INVENTION

The present invention overcomes the problems encountered in the prior art discussed above, and other problems, by providing a liquid flow control system including a housing assembly for a fixed cone sleeve valve that allows the fixed cone sleeve valve to be successfully operated as an in-line control valve without causing excessive cavitation, noise and vibration within the system.

In general, a liquid flow control system of the present invention comprises an upstream length of conduit, a downstream length of conduit, a valve housing, a cone valve seat and a sleeve valve. The valve housing is connected between the upstream length of conduit and the downstream length of conduit. The valve housing directs a flow of liquid that exits the upstream length of conduit through the valve housing and into the downstream length of conduit. The cone valve seat is mounted stationary in the valve housing. The sleeve valve is mounted in the valve housing for movement between a closed position and an opened position. When in the closed position, the sleeve valve engages around a base of the cone valve seat and blocks the flow of liquid through the valve housing and into the downstream length of conduit. When in the opened position, the sleeve valve is disengaged from the base of the cone valve seat and unblocks the flow of liquid through the valve housing and into the downstream conduit.

In another aspect of the present invention, a housing assembly for a fixed cone sleeve valve includes a valve housing portion and a downstream portion downstream of the valve housing portion. The valve housing portion of the housing assembly has an upstream end and a downstream end and a hollow interior volume. The valve housing portion of the housing assembly is adapted to house the fixed cone sleeve valve therewithin. The downstream portion of the housing assembly has an input end and an output end and a hollow interior volume. The input end of the downstream portion is connected to the downstream end of the valve housing portion. The interior volume of the downstream portion has a cross-sectional diameter at its input end equal to a cross-sectional diameter of the interior volume of the downstream end of the valve housing portion. The interior volume of the downstream portion has a smaller cross-sectional diameter at its output end than the cross-sectional diameter of the interior volume of the downstream portion at its input end.

In still another aspect of the present invention, a liquid flow control system comprises a closed hydraulic system and a fixed cone sleeve valve assembly. The closed hydraulic system has a hollow interior sealed from an exterior environment. The fixed cone sleeve valve assembly is positioned within the hollow interior of the closed hydraulic system and is adapted for use in the closed hydraulic system as an in-line flow control valve.

Other advantages and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

A housing assembly of the present invention is represented in its entirety in FIGS. 1 through 6 by the reference numeral 20. In general, the housing assembly 20 includes an upstream length of conduit 22, a downstream length of conduit 24, and a valve housing 26 connected between the upstream conduit 22 and the downstream conduit 24 to direct a flow of liquid that exits the upstream conduit 22 and flows through the valve housing 26 and into the downstream conduit 24.

The upstream conduit 22 has an input end 30 and an output end 32, and a hollow interior volume between the input end 30 and the output end 32. The valve housing 26 has an upstream end 34 and a downstream end 36 and a hollow interior volume therebetween. The output end 32 of the upstream conduit 22 is connected to the upstream end 34 of the valve housing 26. Preferably, the output end 32 of the upstream conduit 22 and the upstream end 34 of the valve housing 26 each have mating flanges that are connected to one another by mechanical fasteners 42.

The downstream conduit 24 has an input end 38 and an output end 40, and a hollow interior volume between the input end 38 and the output end 40. The input end 38 of the downstream conduit 24 is connected to the downstream end 36 of the valve housing 26. Preferably, the downstream end 36 of the valve housing 26 and the input end 38 of the downstream conduit 24 each have mating flanges that are connected to one another by mechanical fasteners 42. The input end 38 of the downstream conduit 24, together with the downstream end 36 of the valve housing 26, defines a plane P1 between the downstream end 36 of the valve housing 26 and the input end 38 of the downstream conduit 24.

Preferably, the upstream conduit 22 and the downstream conduit 24 are connected to the valve housing 26 in a manner so that the interior volume of the valve housing 26 is sealed from an exterior environment of the valve housing 26. The upstream end 34 of the valve housing 26 is connected to the upstream conduit 22 so that the valve housing 26 receives all of the flow of liquid through the upstream conduit 22. The downstream end 36 of the valve housing 26 is connected to the downstream conduit 24 to direct all of the flow of liquid received in the valve housing 26 into the downstream conduit 24. Thus, the upstream conduit 22, downstream conduit 24 and valve housing 26, together, provide a closed liquid flow control system having a hollow interior that is sealed from the exterior environment.

Figure 5A:
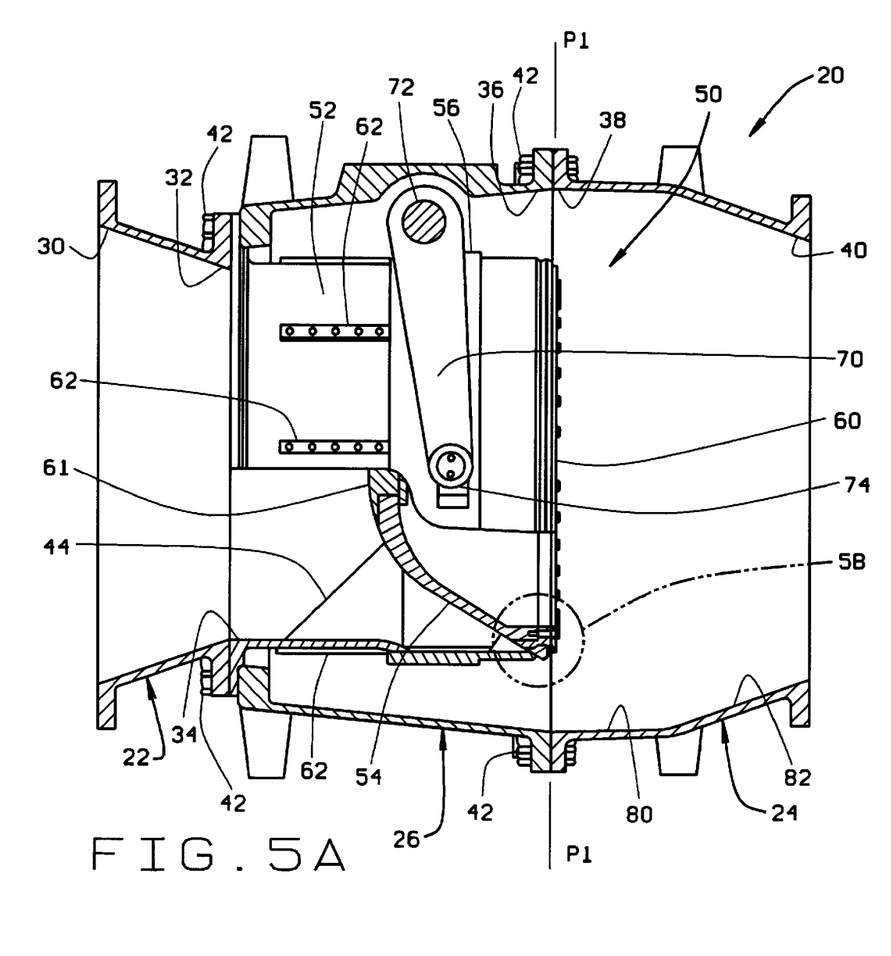
FIGS. 5A and 5B are partial cross-sectional elevation views of the fixed cone sleeve valve housing of FIG. 1, shown with a fixed cone sleeve valve in a closed position, and showing an enlarged detail of portions of the sleeve and conical valve seat.
Figure 5B:
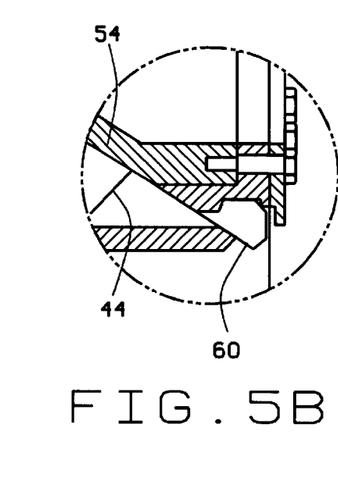
Figure 6:
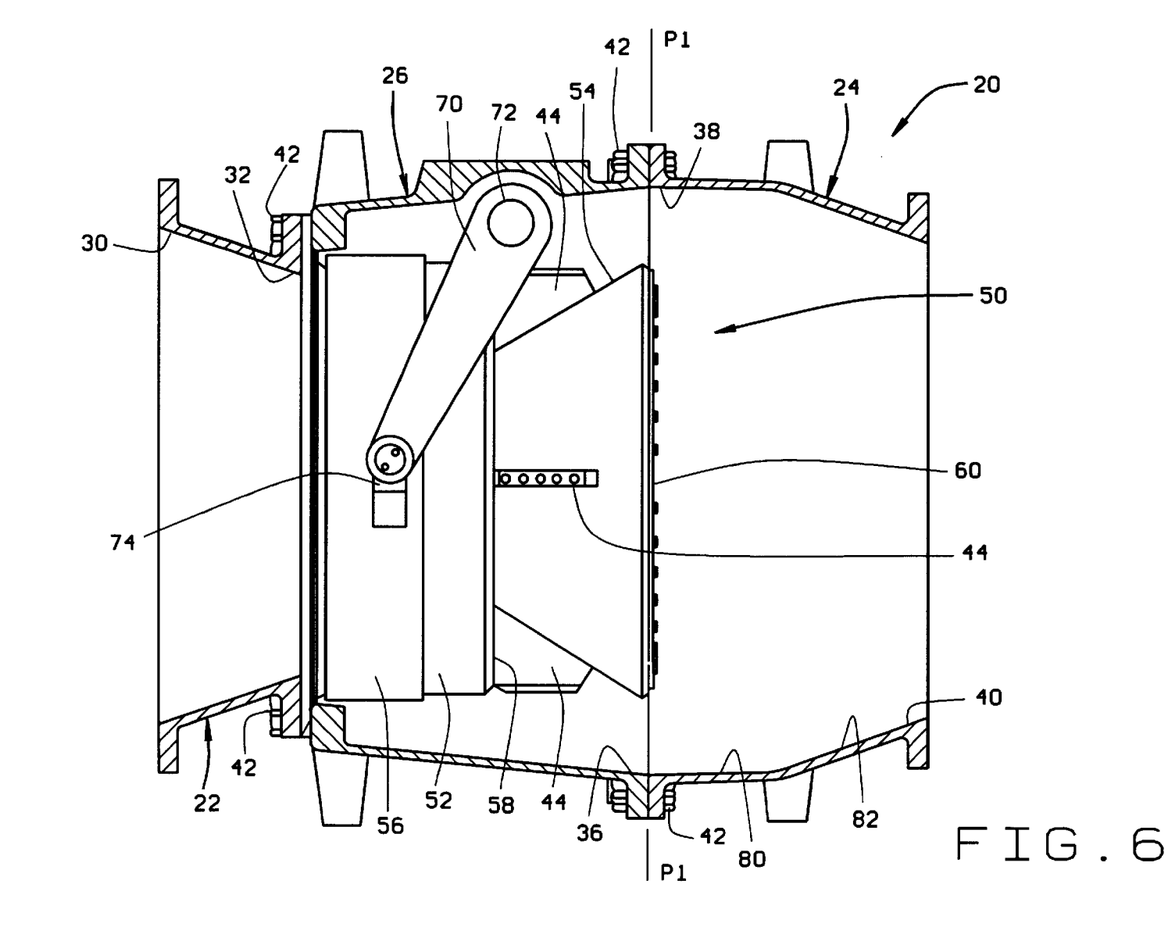
FIG. 6 is a partial cross-sectional elevation view of the fixed cone sleeve housing of FIG. 5, shown with the fixed cone sleeve valve in an open position.

In the preferred embodiment shown in FIGS. 5 and 6, the cross-sectional area of the interior volume of the upstream conduit 22 at its input end 30 is larger than the cross-sectional area of the interior volume of the upstream conduit 22 at its output end 32. Preferably, the interior volume of the upstream conduit 22 has a cross-sectional area at its input end 30 that is equal to the cross-sectional area of the downstream conduit 24 at its output end 40. Also, in the preferred embodiment, the cross-sectional area of the interior volume of the valve housing 26 at its downstream end 36 is larger than a cross-sectional area of the interior volume of the valve housing 26 at its upstream end 34.

Figure 1:
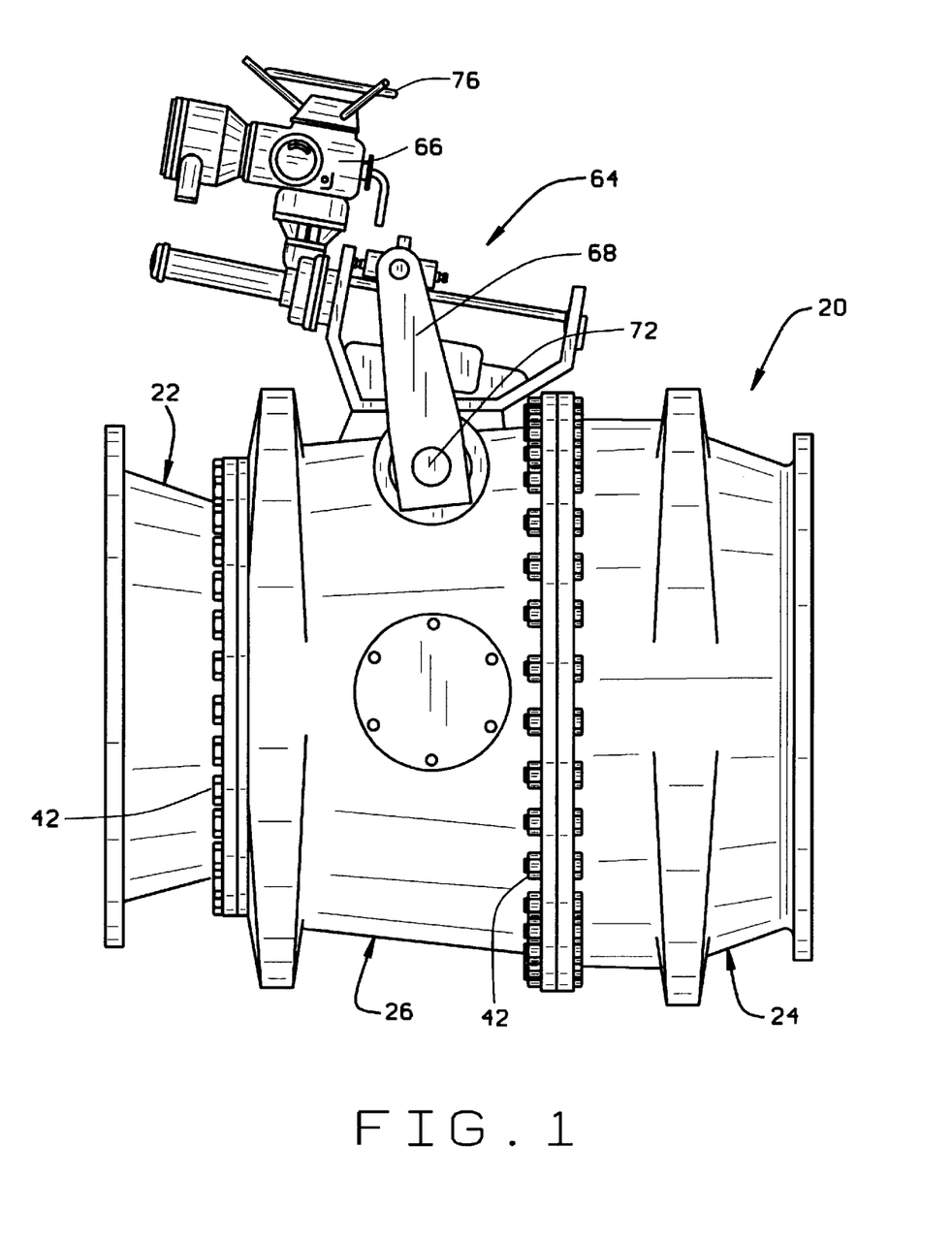
FIG. 1 is a side elevation view of a fixed cone sleeve valve housing of the present invention.
Figure 2:
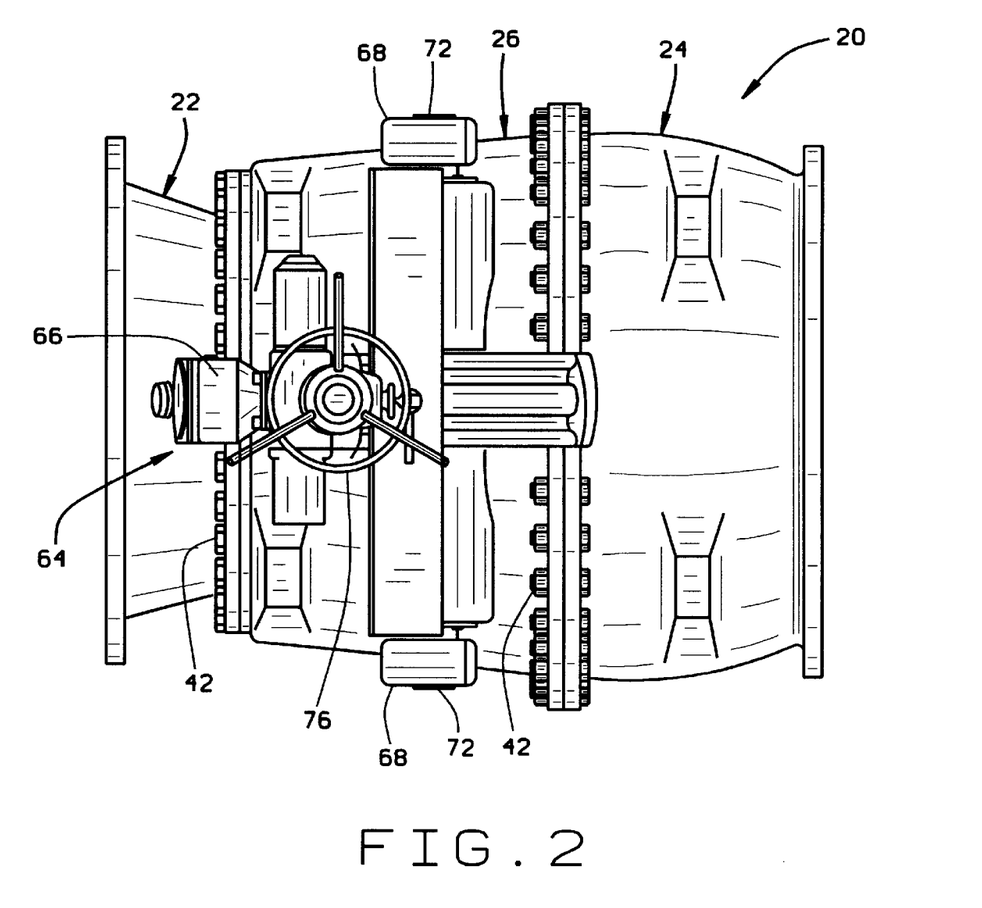
FIG. 2 is a top plan view of the fixed cone sleeve valve housing of FIG. 1.
Figure 3:
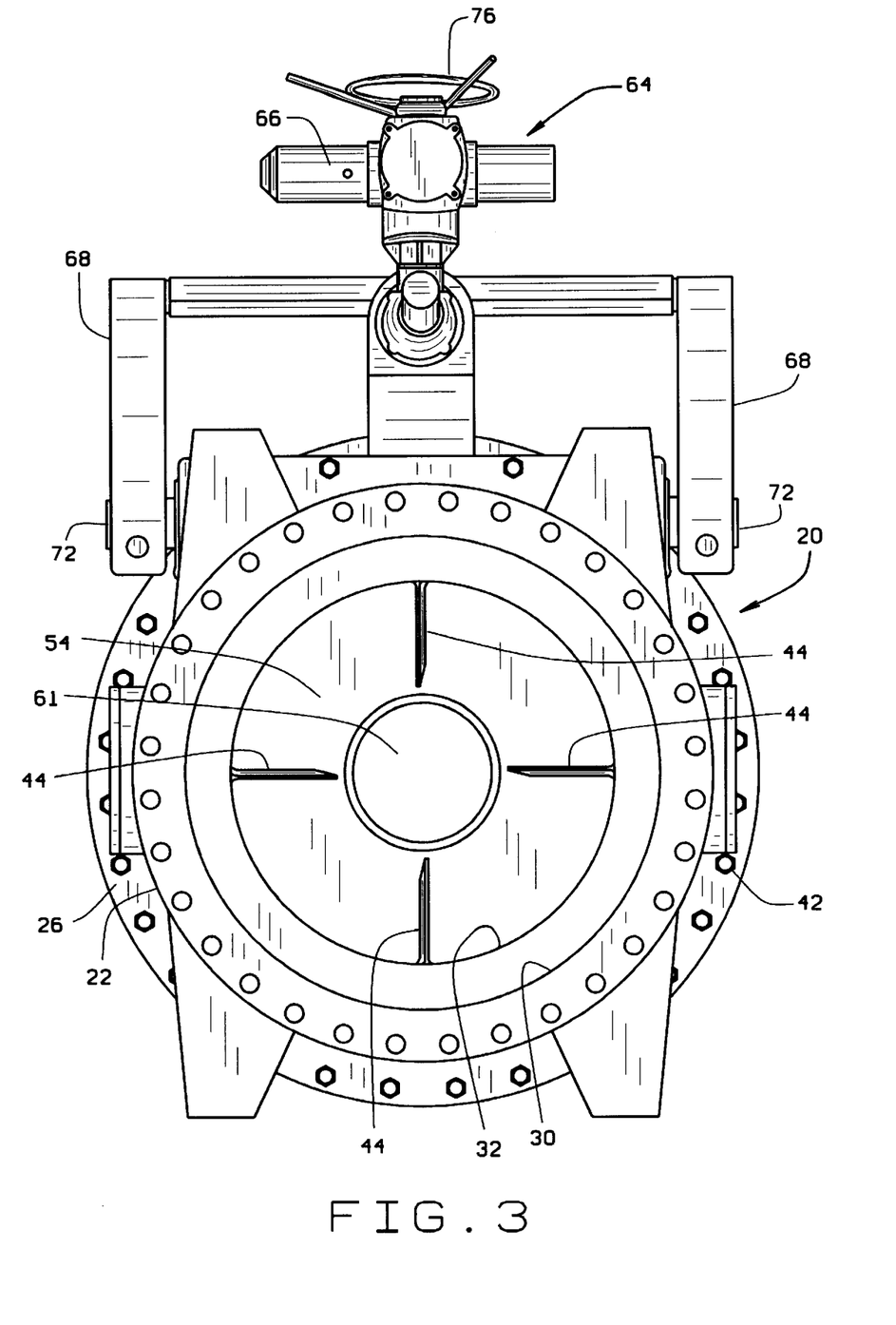
FIG. 3 is an upstream end view of the fixed cone sleeve valve housing of FIG. 1.
Figure 4:
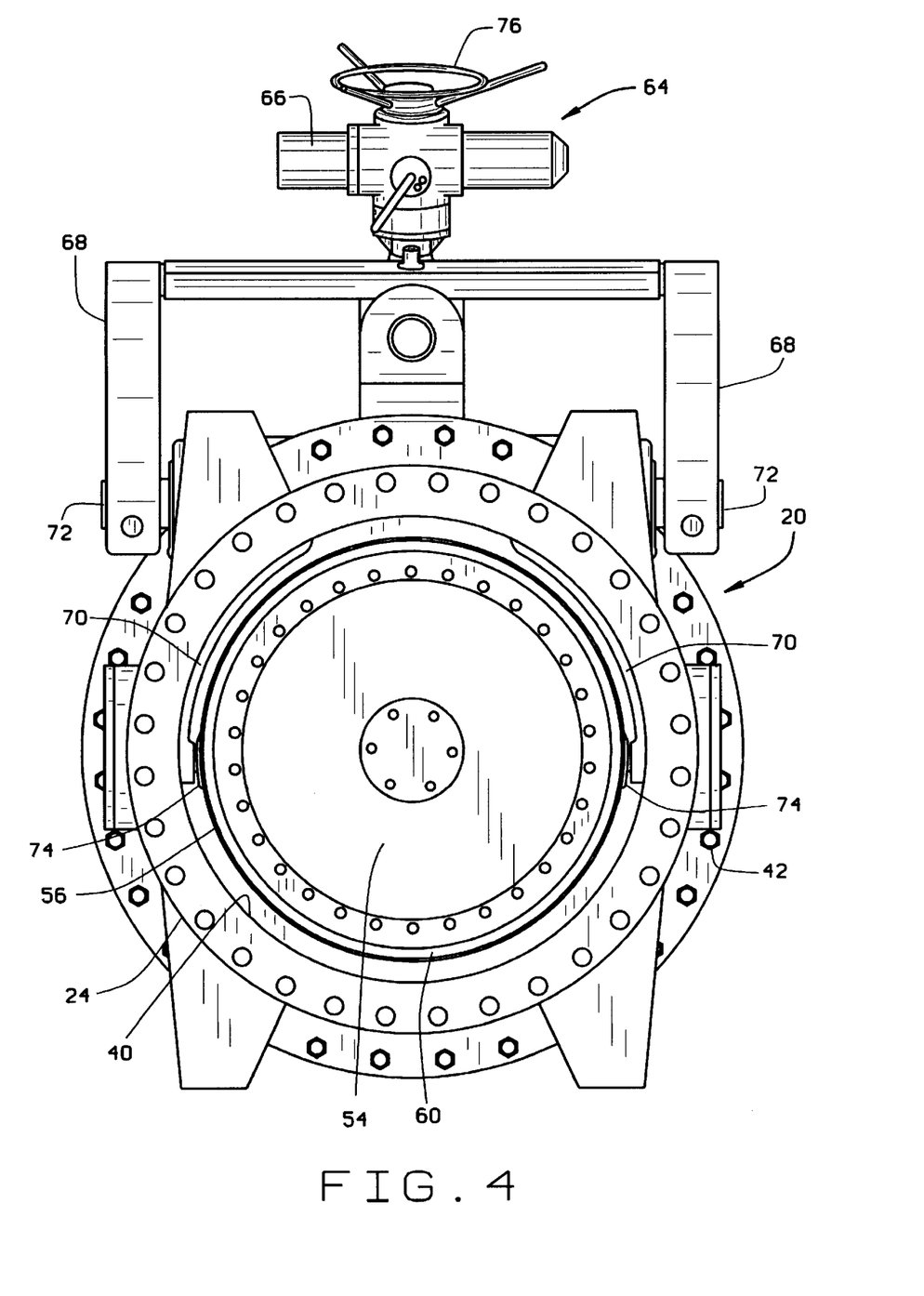
FIG. 4 is a downstream end view of the fixed cone sleeve valve housing of FIG. 1.

A fixed cone sleeve valve assembly is represented generally by the reference numeral 50 in FIGS. 5 and 6. The fixed cone sleeve valve assembly 50 is mounted within the hollow interior volume of the valve housing 26 and, as explained below in more detail, is adapted for use in the closed system as an in-line flow control valve. The fixed cone sleeve valve assembly 50 comprises an inner conduit 52, a cone valve seat 54, and a sleeve valve 56. The inner conduit 52 has an interior volume in communication with the upstream conduit 22. The cone valve seat 54 is fixedly connected to the inner conduit 52 and is positioned adjacent an output end 58 of the inner conduit 52. The cone valve seat 54 is connected to the interior surface of the inner conduit 52 by a plurality of radially extending vanes 44, which extend from the cone valve seat 54 to the interior surface of the inner conduit 52. As shown in FIG. 3, the vanes are slightly angled in order to create a slightly torsional flow. It has been found that a slightly torsional flow helps to reduce vibration of the vanes 44 and thereby reduces the likelihood of damage to the vanes 44. A base 60 of the cone valve seat 54 is positioned in the plane P1, which is defined by the interface of the downstream end 36 of the valve housing 26 and the input end 38 of the downstream conduit 24. An apex 61 of the cone valve seat 54 is pointed upstream of the base 60.

The sleeve valve 56 surrounds the inner conduit 52 and, as described below more fully, is adapted for axial movement relative to the inner conduit 52 between a closed position and an open position. In the closed position (shown in FIG. 5), the sleeve valve 56 engages around the base 60 of the cone valve seat 54 and blocks the flow of liquid from the inner conduit 52. In the open position (shown in FIG. 6), the sleeve valve 56 is disengaged from the base 60 of the cone valve seat 54 and unblocks the flow of liquid from the inner conduit 52.

As shown in FIG. 5, the inner conduit 52 preferably includes a plurality of sleeve valve guides 62 spaced around its exterior surface. The guides 62 are connected to and extend axially along the exterior surface of the inner conduit 52. Preferably, the interior surface of the sleeve valve 56 includes a plurality of axially extending grooves (not shown) which are configured to receive the guides 62 to thereby guide the axial movement of the sleeve valve 56 relative to the inner conduit 52 as the sleeve valve 56 moves between its open and closed positions.

Axial movement of the sleeve valve 56 is powered by a sleeve valve drive assembly, which is represented generally in FIGS. 1–4 by the reference numeral 64. The drive assembly 64 generally comprises an external control mechanism 66, a pair of external drive arms 68 and, as shown in FIGS. 5 and 6, further comprises a pair of internal drive arms 70 a shaft 72 on which the internal and external drive arms 68 and 70 rotate, and a drive block 74. As shown in FIGS. 1–4, the external control mechanism 66 includes a wheel 76 for manual operation of the drive assembly 64. The wheel 76 is operatively connected to the external drive arms 68 in a manner so that rotation of the wheel 76 in one direction results in movement of the external drive arms 68 in a downstream direction (clockwise as viewed in FIG. 1) which results in movement of the sleeve valve 56 toward its open position Rotation of the wheel 76 in the opposite direction results in movement of the external drive arms 68 in an upstream direction (counter-clockwise as viewed in Figure) which results in movement of the sleeve valve 56 toward its closed position. The internal drive arms 70 are connected to the shaft 72 and rotate with the external drive arms 68 about the shaft 72. The sleeve valve drive block 74 is mounted to the exterior surface of the sleeve valve 56. An identical sleeve valve drive block (not shown) is mounted to the opposite side of the sleeve valve 56. As shown in FIGS. 5 and 6, the internal drive arms 70 are connected to the drive blocks 74 for driving the sleeve valve 56 between its closed position (shown in FIG. 5) and its open position (shown in FIG. 6).

The downstream conduit 24 is configured to serve as a reducer for constricting the flow of fluid issued from the valve assembly 50, and for directing the flow of fluid into a downstream pipeline (not shown).

Preferably, the interior volume of the downstream conduit 24 has a cross-sectional area at its input end 38 that is equal to a cross-sectional area of the interior volume of the valve housing 26 at its downstream end 36. Also, preferably, the interior volume of the downstream conduit 24 has a cross-sectional area at its output end 40 that is smaller than the cross-sectional area at its input end 38, so that the downstream conduit 24 serves as a reducer.

Preferably, the downstream conduit 24 is comprised of a first body section 80 and a second body section 82 downstream of the first body section 80. In the preferred embodiment shown in FIGS. 5 and 6, the first body section 80 is adjacent the input end 38 and has a generally cylindrical configuration with a constant interior diameter as it extends from the input end 38 of the downstream conduit 24 toward the output end 40 thereof.

The second body section 82 of the downstream conduit 24 extends in the downstream direction from the first body section 80 to the output end 40 of the downstream conduit 24. Preferably, as shown in FIGS. 5 and 6, the second body section 82 of the downstream conduit 24 has a generally conical configuration with a cross-sectional diameter that decreases as the second body section 82 extends from the first body section 80 toward the output end 40 of the downstream conduit 24. The first body section 80 serves as a spacer that spaces the conical second body section 82, which serves as a reducer, from the downstream end 36 of the valve housing 26 and from the base 60 of the cone valve seat 54.

Preferably, the first and second body sections 80 and 82 of the downstream conduit 24 are integral with one another. More preferably, the downstream conduit 24 is a single, monolithic unit between its input end 38 and output end 40. This provides a smooth transition from the interior surface of the first body section 80 to the interior surface of the second body section 82, Alternatively, the two body sections could be separate lengths of conduit held together by mechanical fasteners. It has been found that, due to the high velocity of the jet issuing from the valve assembly 50, the interior of the downstream conduit 24 should be as smooth and streamlined as possible in order to achieve maximum flow capacity and cavitation limits.

Although the preferred embodiment of the present invention does not rely on flow aeration, the housing assembly could employ one or more aeration ports (also sometimes referred to as vacuum relief valves) to further suppress cavitation without departing from the scope of the present invention. When used, aeration ports are generally located downstream from a valve assembly where cavitation would be most likely to occur.

Although, in general, flow aeration may help to suppress cavitation, it is generally understood that aeration decreases a valve's overall flow capacity. As discussed above, the generally cylindrical first body section 80 serves as a spacer that spaces the conical second body section 82 from the downstream end 36 of the valve housing 26 and from the base 60 of the cone valve seat 54. It has been found that the use of spacers between the valve assembly 50 and the conical second body section 82 delay the constriction of the flow and thereby enhance the flow capacity and cavitation limits associated with the system.

The axial length of the first body section or spacer 80 is critical to the operation of the downstream conduit 24 in reducing or eliminating cavitation in the liquid discharged from a fixed cone sleeve valve that is operated as an in-line control valve. Through experimentation it has been determined that the optimum reduction in cavitation can be obtained by dimensioning the spacer 80 with an axial length that is one-half (½) of the interior diameter of the inner conduit 52 of the sleeve valve 56 and with an interior diameter that is one and one-half (1½) times the interior diameter of the inner conduit 52. For example, if the interior diameter of the inner conduit 52 is six feet, then the spacer 80 will have an interior diameter along its entire axial length of nine feet and will have an axial length of three feet. This axial dimension of the spacer 80 spaces the reducer 82 three feet from the plane P1 in which the base 60 of the cone valve is positioned. Note also that the dimensions of the interior diameter of the valve inner conduit 52 also determines the diameter of the valve housing 26 at its downstream end 36. The interior diameter of this end of the housing matches the interior diameter determined for the spacer 80. Of course, the relative dimensions of the component parts and their ratios to each other could be varied slightly without significantly affecting the operation of the valve housing assembly 20 in reducing or eliminating cavitation.

Thus, the present invention provides a closed liquid flow control system including a fixed cone sleeve valve that can be operated as an in-line control valve and that is capable of operating accurately at high pressure heads without causing excessive cavitation, noise or vibration within the system. In view of the above, it will be seen that the present invention overcomes problems associated with the prior art and achieves other advantageous results.

As various changes could be made without departing from the scope of the invention, it is intended that all matter contained in the above description or shown in the accompanying drawings shall be interpreted as illustrative and not in a limiting sense.

What is claimed is:

1. A liquid flow control system comprising:
   an upstream length of conduit;
   a downstream length of conduit;
   a valve housing connected between the upstream length of conduit and the downstream length of conduit to direct a flow of liquid that exits the upstream length of conduit through the valve housing and into the downstream length of conduit;

a cone valve seat mounted stationary in the valve housing; and, a sleeve valve mounted in the valve housing for movement between a closed position of the sleeve valve where the sleeve valve engages around a base of the cone valve seat and blocks the flow of liquid through the valve housing and into the downstream length of conduit, and an opened position of the sleeve valve where the sleeve valve is disengaged from the base of the cone valve seat and unblocks the flow of liquid through the valve housing and into the downstream conduit;

the downstream length of conduit is comprised of a first body section and a second body section connected to the first body section, the first body section having an upstream end, a downstream end and a first interior surface defining a first interior volume between the upstream and downstream ends, the first interior volume having a generally constant interior diameter as it extends from its upstream end to its downstream end, the second body section having an input end, an output end and a second interior surface defining a second interior volume between the input and output ends, the input end of the second body section is connected to the downstream end of the first body section, the second interior volume having a generally decreasing interior diameter as it extends from its input end to its output end, the second body section being connected to the first body section in a manner to provide a streamlined transition between the first interior surface and the second interior surface.

2. The liquid flow control system of claim 1, wherein:

the valve housing has an upstream end and a downstream end, and the cone valve seat and the sleeve valve are sealed from an exterior environment of the valve housing by the upstream length of conduit attached to the upstream end of the valve housing and the downstream length of conduit attached to the downstream end of the valve housing.

3. The liquid flow control system of claim 1, wherein:

the valve housing has an upstream end and a downstream end, and the valve housing upstream end is connected to the upstream conduit to receive all of the flow of liquid through the upstream conduit, and the valve housing downstream end is connected to the downstream conduit to direct all of the flow of liquid received in the valve housing into the downstream conduit.

4. The liquid flow control system of claim 1, wherein:

the valve housing has an upstream end and a downstream end and a hollow interior volume, and wherein the downstream conduit has an input end and an output end and a hollow interior volume therebetween, the input end of the downstream conduit is connected to the downstream end of the valve housing, the interior volume of the downstream conduit has a cross-sectional area at its input end that is equal to a cross-sectional area of the valve housing interior volume at the valve housing downstream end, and the interior volume of the downstream conduit has a cross-sectional area at its output end that is smaller than the cross-sectional area at its input end.

5. The liquid flow control system of claim 4, wherein:

the upstream conduit has an input end and an output end and a hollow interior volume therebetween, the output end of the upstream conduit is connected to the upstream end of the valve housing, the interior volume of the upstream conduit has a cross-sectional area at its input end that is equal to the cross-sectional area of the downstream conduit at its output end.

6. The liquid flow control system of claim 5, wherein:

the cross-sectional area of the valve housing interior volume at the valve housing downstream end is larger than a cross-sectional area of the valve housing interior volume at the valve housing upstream end.

7. The liquid flow control system of claim 6, wherein:

the output end of the upstream conduit is connected to the upstream end of the valve housing, the interior volume of the upstream conduit has a cross-sectional area at its output end that is equal to the cross-sectional area of the valve housing interior volume at the valve housing upstream end, the cross-sectional area of the interior volume of the upstream conduit at its input end being larger than the cross-sectional area of the interior volume of the upstream conduit at its output end.

8. The liquid flow control system of claim 1, wherein:

the valve housing has an upstream end and a downstream end;

the downstream conduit has an input end and an output end, the input end being connected to the downstream end of the valve housing and, together with the downstream end of the valve housing, defines a plane between the downstream end of the valve housing and the input end of the downstream conduit; and, the base of the cone valve seat is positioned in the plane defined by the downstream end of the valve housing and the input end of the downstream conduit.

9. The liquid flow control system of claim 1, wherein:

the downstream conduit is a single, monolithic unit between its input and output ends.

10. A housing assembly for a fixed cone sleeve valve comprising an inner conduit, a cone valve seat fixedly connected to the conduit and positioned adjacent a downstream end thereof, and a sleeve valve surrounding the inner conduit and adapted for movement between a closed position of the sleeve valve where the sleeve valve engages around a base of the cone valve seat and blocks the flow of liquid from the inner conduit, and an opened position of the sleeve valve where the sleeve valve is disengaged from the base of the cone valve seat and unblocks the flow of liquid from the inner conduit, the housing assembly comprising:

a valve housing portion having an upstream end and a downstream end and a hollow interior volume, the valve housing portion being adapted to house the fixed cone sleeve valve therewithin; and, a downstream portion downstream of the valve housing portion, the downstream portion having an input end and an output end and a hollow interior volume, the input end of the downstream portion being connected to the downstream end of the valve housing portion, the interior volume of the downstream portion having a cross-sectional diameter at its input end equal to a cross-sectional diameter of the interior volume of the downstream end of the first portion, the interior volume of the downstream portion having a smaller cross-sectional diameter at its output end than the cross-sectional diameter of the interior volume of the downstream portion at its input end, the downstream portion being comprised of a first body section and a second body section, the first body section having an upstream end, a downstream end and a first interior surface defining a first interior volume between the upstream and downstream ends, the first interior volume having a generally constant interior diameter as it extends from its upstream end to its downstream end, the second body section having an input end, an output end and a second interior surface defining a second interior volume between the input and output ends, the input end of the second body section is connected to the downstream end of the first body section, the second interior volume having a generally decreasing interior diameter as it extends from its input end to its output end, the second body section being connected to the first body section in a manner to provide a streamlined transition between the first interior surface and the second interior surface.

11. The housing assembly of claim 10, wherein:
the downstream portion of the housing assembly is a single, monolithic unit between its input and output ends.

12. A liquid flow control system comprising:
a closed hydraulic system having a hollow interior sealed from an exterior environment; and
a fixed cone sleeve valve assembly comprising a cone valve seat and a sleeve valve, the cone valve seat being positioned completely within the hollow interior of the closed hydraulic system, the sleeve valve being positioned completely within the hollow interior of the system for movement between a closed position of the sleeve valve wherein the sleeve valve engages around a base of the cone valve seat to block a flow of liquid through the system and an opened position of the sleeve valve wherein the sleeve valve is disengaged from the base of the cone valve seat to unblock the flow of liquid through the system, the fixed cone sleeve valve assembly being adapted for use in the closed hydraulic system as an in-line flow control valve;
the closed hydraulic system including an upstream conduit, a downstream conduit, and a valve housing connected between the upstream conduit and the downstream conduit to direct a flow of liquid that exits the upstream conduit through the valve housing and into the downstream conduit, the fixed cone sleeve valve assembly being positioned within the valve housing;
the valve housing having an upstream end and a downstream end and a hollow interior volume, the downstream conduit having an input end and an output end and a hollow interior volume therebetween, the input end of the downstream conduit being connected to the downstream end of the valve housing and, together with the downstream end of the valve housing, defines a plane between the downstream end of the valve housing and the input end of the downstream conduit;
wherein the fixed cone sleeve valve assembly further comprises:
an inner conduit having an interior volume in communication with the upstream conduit;
the cone valve seat being fixedly connected to the inner conduit and positioned adjacent an output end thereof, the base of the cone valve seat being positioned in the plane defined by the downstream end of the valve housing and the input end of the downstream conduit, the cone valve seat having an apex upstream of the base;
the sleeve valve surrounding the inner conduit and being adapted for movement relative thereto between its opened and closed positions.

13. The liquid flow control system of claim 12, wherein the input end of the downstream conduit is connected to the downstream end of the valve housing, the interior volume of the downstream conduit includes a conical segment extending toward the output end of the downstream conduit, the conical segment having a cross-sectional diameter that decreases as the conical segment extends toward the output end of the downstream conduit.

14. The liquid flow control system of claim 13, wherein the conical segment extends from an upstream end of the conical segment to the output end of the downstream conduit.

15. The liquid flow control system of claim 14, wherein the interior volume of the downstream conduit has a cross-sectional diameter at its output end that is smaller than a cross-sectional diameter at its input end.

16. The liquid flow control system of claim 15, wherein the downstream conduit is a single, monolithic unit between its input and output ends.

17. The liquid flow control system of claim 13, wherein an upstream end of the conical segment is spaced from the downstream end of the valve housing.

* * * * *